United States Patent [19]

Taguchi

[11] Patent Number: 5,105,282
[45] Date of Patent: Apr. 14, 1992

[54] VIDEO SIGNAL CORRECTING DEVICE

[75] Inventor: Tomishige Taguchi, Urawa, Japan

[73] Assignee: Canon Kabushiki Kaisha, Tokyo, Japan

[21] Appl. No.: 622,226

[22] Filed: Dec. 3, 1990

Related U.S. Application Data

[63] Continuation of Ser. No. 442,382, Nov. 27, 1989, abandoned, which is a continuation of Ser. No. 317,041, Feb. 28, 1989, abandoned, which is a continuation of Ser. No. 915,237, Oct. 3, 1986, abandoned.

[30] Foreign Application Priority Data

Oct. 8, 1985 [JP] Japan .................. 60-224502

[51] Int. Cl.$^5$ ............................................. H04N 5/94
[52] U.S. Cl. ................................... 358/336; 360/38.1
[58] Field of Search ............ 358/314, 336, 36, 37, 358/163, 166, 167, 213.17; 360/38.1; 382/54, 55

[56] References Cited

U.S. PATENT DOCUMENTS

| | | | |
|---|---|---|---|
| 4,054,903 | 10/1977 | Ninomiya | 358/314 X |
| 4,250,521 | 2/1981 | Wright | 358/336 X |
| 4,287,529 | 9/1981 | Tatami et al. | 360/38.1 X |
| 4,376,290 | 3/1983 | Shirota | 358/336 X |
| 4,517,600 | 5/1985 | Reitmeier | 358/336 X |
| 4,591,925 | 5/1986 | Trytko | 358/336 |
| 4,605,966 | 8/1986 | Collins | 358/336 X |

Primary Examiner—W. B. Perkey
Attorney, Agent, or Firm—Robin, Blecker, Daley & Driscoll

[57] ABSTRACT

Disclosed is a video signal correcting device comprising area memorizing means for memorizing a video signal reproduced from a medium for one field unit or frame unit, means for detecting a drop-out of the reproduced video signal, drop-out position memorizing means for memorizing the position of the drop-out detected by the detecting means, and means for interpolating and changing information of the area memorizing means corresponding to the drop-out position memorized by the drop-out position memorizing means.

27 Claims, 5 Drawing Sheets

VIDEO SIGNAL CORRECTING DEVICE

This is a continuation application under 37 CFR 1.62 of prior application Ser. No. 442,382, filed Nov. 27, 1989 now abandoned which is a continuation of application Ser. No. 317,041, filed Feb. 28, 1989 now abandoned, which is a continuation of application Ser. No. 915,237, filed Oct. 3, 1986, now abandoned.

BACKGROUND OF THE INVENTION

1. Field of the Invention

The present invention relates to a video signal correcting device for correcting the non-presence of an analog video signal or the so-called drop-out.

2. Description of the Related Art

A conventional drop-out correcting circuit is constructed as is shown in FIG. 2. The level of the envelope of an FM analog video signal inputted through an input terminal 1 is detected by an envelope detector 2 and is led to a comparator 3. The comparator 3 delivers a drop-out detecting pulse DOC to an analog switch 4 when the level of the envelope becomes lower than a voltage of a power source 3'. To the analog switch 4, a signal delayed by 1H (horizontal period) by a delay line 7 and a present signal are inputted in such a manner that the analog switch 4 replaces a signal before 1H with the drop-out part by the drop-out detecting pulse DOC so as to correct the non-presence of the signal. Further, such a device are constructed in such a manner that the signal are demodulated in a demodulator 5 and then converted into a digital signal by an A/D converter 6 to be stored in an image memory 8. In case of such a construction, defects remain in an image signal very often when the analog switch 4 is changed over at the start and the end of the drop-out. Furthermore, it is very difficult to match the level of a signal having passed the 1H delay line 7 with that of a signal not having passed the delay line 7.

Further, a signal before 1H is simply replaced with the drop-out part, so that when the drop-out takes place at a position which is hardly relative to the signal before 1H, a good correction cannot be obtained, which is inconvenient.

SUMMARY OF THE INVENTION

It is, accordingly, a first object of the present invention to povide a video signal correcting device free from any of the above respective shortcomings or all of them.

Further, it is a second object of the present invention to provide a video signal correcting device for correcting a drop-out part of a video signal in a suitable way.

For such objects, according to the preferred embodiment of the present invention, a video signal correcting device comprises area memorizing means for memorizing a video signal reproduced from a medium for one field unit or frame unit, means for detecting a drop-out of the reproduced video signal, drop-out position memorizing means for memorizing the position of the drop-out detected by the detecting means, and means for interpolating and changing information of the area memorizing means corresponding to the drop-out position memorized by the drop-out position memorizing means.

Namely, by memorizing the drop-out position it is possible to well correct the position at which the drop-out took place by means of the after-process.

It is still another object of the present invention to provide a video signal correcting device capable of well treating the drop-out subsequent to its occurrence by memorizing the drop-out position.

It is still another object of the present invention to provide a video signal correcting device capable of well correcting the drop-out automatically.

Other objects and features of the present invention will become apparent from the description of the embodiment thereof to be made below according to the accompanying drawings.

DETAILED DESCRIPTION OF THE PREFERRED EMBODIMENT

Below the present invention will be explained according to the drawings of an preferred embodiment.

Figure 1:
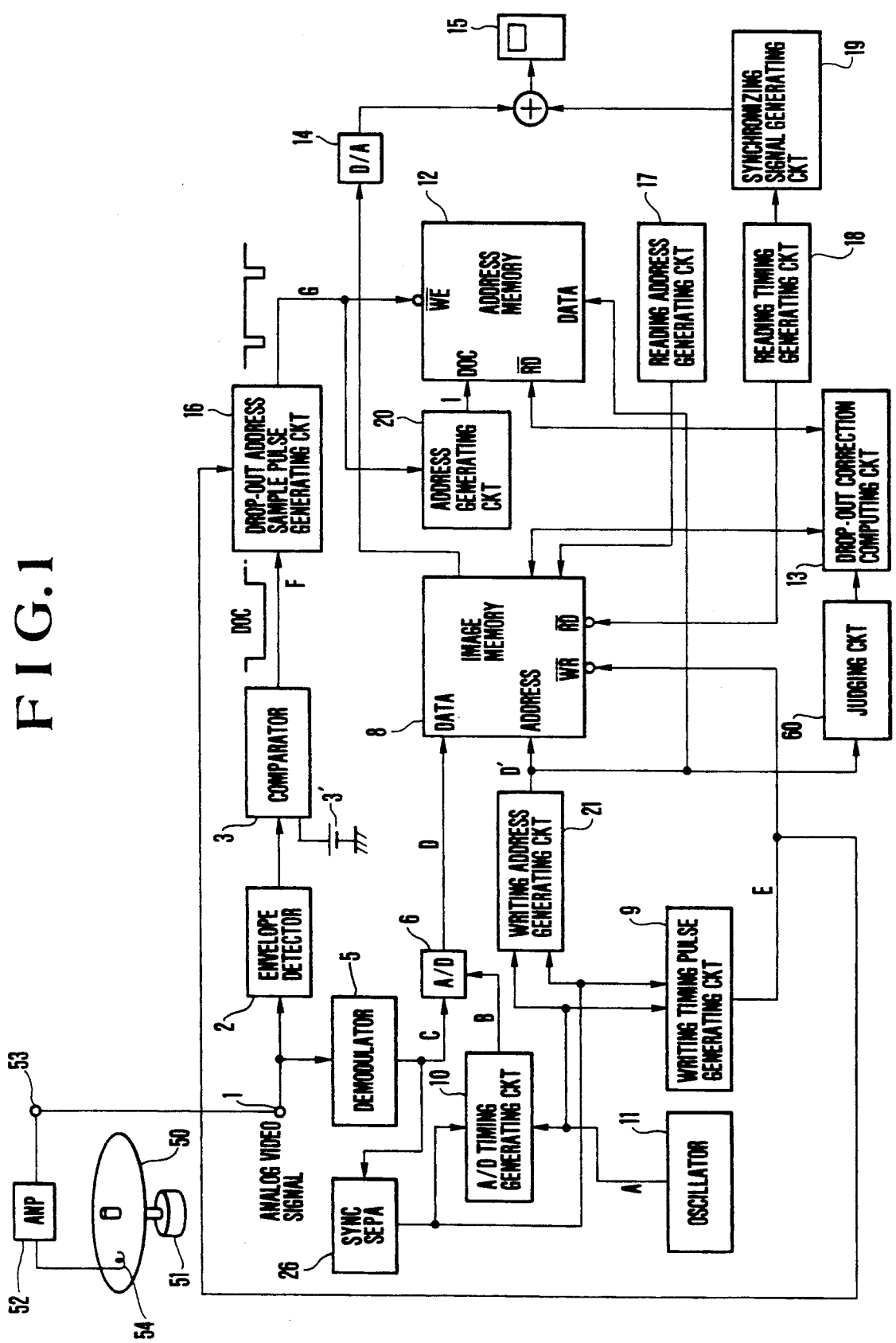
FIG. 1 shows a block diagram of an embodiment of the present invention.
Figure 2:
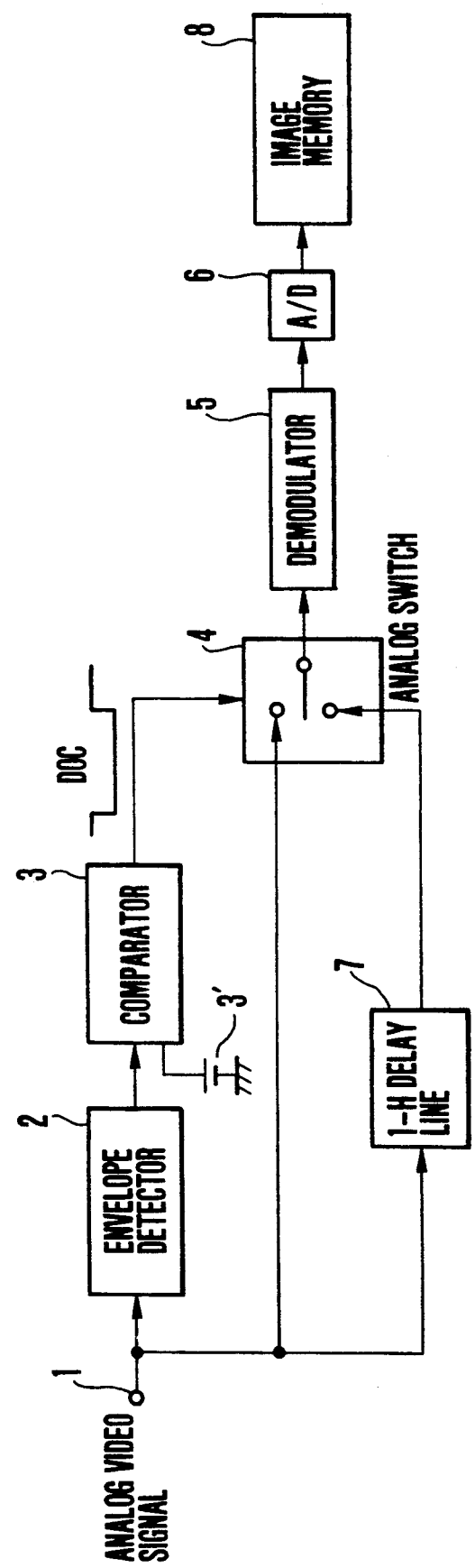
FIG. 2 shows a block diagram of a conventional drop-out correcting circuit.
Figure 3:
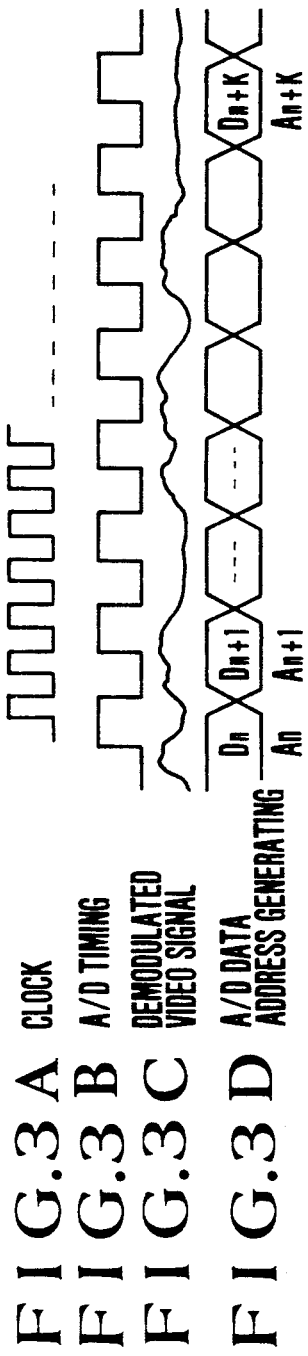
FIGS. 3A to 3I show wave forms at various parts in FIG. 1.

FIG. 1 shows a block diagram of a embodiment of the present invention. In the drawing, 1 is a terminal into which a video signal reproduced from a magnetic recording medium 50 is inputted. Hereby the recording medium 50 is a disc on which, for example, tracks are formed concentrically, whereby the video signal for one field is recorded on one circle. The recorded signal is reproduced by a head 54 and amplified by an amplifier 52. 51 is a motor for rotating the medium 50.

Figure 4:
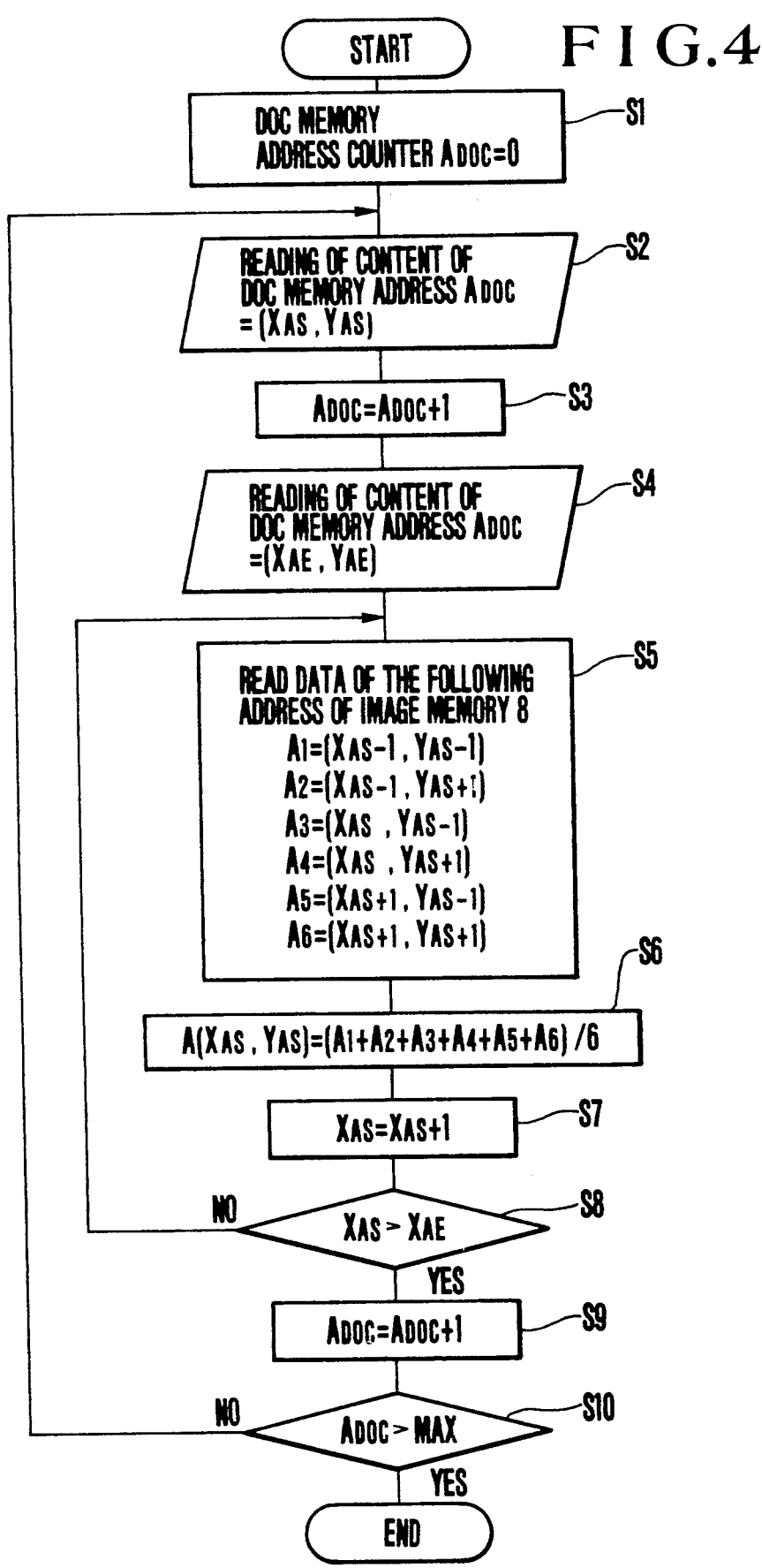
FIG. 4 shows an embodiment of the steps for correcting the drop-out.

An FM analog signal reproduced from the magnetic recording medium 50 is R,G,B signals or luminance signals and is inputted via the input terminal 1. The input analog signal is led to an envelope detector 2, which detects the envelope to be inputted to a comparator 3. When the level of the envelope is below the drop-out detection level, the level of an output F of the comparator 3 becomes low. At the time of the rising up and falling down of this drop-out pulse F, the sample pulse G is produced by a drop-out address sample pulse generating circuit 16 so as to store address information of an image memory 8 in a DOC address memory 12. On the other hand, the FM analog video signal inputted via the terminal 1 is demodulated by a demodulator 5 into a demodulated video signal C to be led to an A/D converter 6. Further, the demodulated video signal C is led to a synchronizing signal separating circuit 26. A timing pulse B for A/D conversion corresponding to a synchronizing signal separated by the separating circuit 26 is applied to the A/D converter 6 by an A/D timing generating circuit 10, and in sychronization with its falling down the video signal is A/D converted into a digital signal D. This digital signal D is led to the image memory 8. Further, an address signal D' is led to the image memory 8 from a writing address generating circuit 21 for writing into the image memory 8. A writing pulse E in synchronization with the rising up of the A/D timing pulse B is generated by a writing timing pulse generating circuit 9. When the level of the writing pulse E is low, the A/D converted data D is written into the image memory 8. Hereby, the address generating circuit 21 and the writing timing pulse generating circuit 9 are reset corresponding to the synchronizing signal separated by the separating circuit 26. Further, the output address signal D' of the address generating circuit 21 is led to the DOC address memory 12. Further, the comparator 3 keeps the level of the drop-out pulse F low while the drop-out is being produced. The drop-out address sample pulse generating circuit 16 generates the drop-out address sample pulse G in synchronization with the first writing pulse E after the falling down of the drop-out pulse F. Then, the drop-out address sample pulse G is generated in synchronization with the first writing pulse E after the rising up of the level of the drop-out pulse F. Hereby, such circuit 16 consists of a one-shot multivibrator for generating pulses whose level is low during the period corresponding to one cycle of the writing pulse E triggered in synchronization with the rising up and the falling down of, for example, the drop-out pulse F, and a gate for producing an OR output of the output of the above oneshot multivibrator and the writing pulse E. The drop-out address sample pulse G is led to the DOC address memory 12 and the address generating circuit 20. The address generating circuit 20 generates the address signal I whose value is added with 1 after a certain determined time after the rising up of the drop-out sample pulse G, namely after the drop-out has been finished. Consequently, when the level of the drop-out sample address pulse G is low, the start and the end of the address of the dropped out signal of the image memory 8 are recorded in the DOC address memory 12. By continuing this sequence for one field or one frame an address area in which the drop-out in one field or one frame is present can be recorded in the DOC address memory 12. A judging circuit 60 automatically judges according to the address generated by the address generating circuit 21 that video signals for one field or one frame have been written. According to the judging results of the judging circuit 60, a drop-out correction computing circuit 13 reads the address position of the drop-out part from the DOC address memory 12, and calculates an area corresponding to the address in sequence as shown in FIG. 4 to rewrite the image memory 8. On the other hand, data written in the image memory 8 is delivered to a D/A converter 14 in sequence from the image memory 8 in response to signals from a reading address generating circuit 17 and a reading timing generating circuit 18 to be read out as an analog signal, which is displayed on a monitor 15, being combined with a television synchronizing signal produced by a synchronizing signal generating circuit 19.

Figure 5:
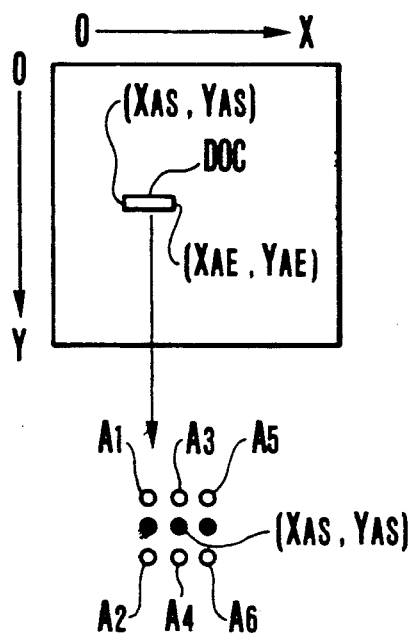
FIG. 5 shows the relation between the dropout on an image memory 8 and its address.

Below, a method for correcting the content of the drop-out part on the image memory 8 will be explained according to the sequence number with reference to FIG. 4. In step S1, a counter $A_{DOC}$ for generating an address for reading data from the DOC address memory 12 is initialized. Then in step S2, the content of the address $A_{DOC}$ of the DOC address memory 12 is loaded. Let the read out data be $(X_{AS}, Y_{AS})$ Hereby, $X_{AS}$ and $Y_{AS}$ are the coordinates of the start address on the image memory 8 of the drop-out part DOC along the directions of row and column, respectively. Then in step S3, 1 is added to the address $A_{DOC}$ in order to read the next address of the address $A_{DOC}$ from the DOC address memory 12. Then, the content of the address $A_{DOC}$ is loaded as $(X_{AE}, Y_{AE})$ (Step S4). $X_{AE}$ and $Y_{AE}$ are the last address on the image memory 8 of the drop-out part DOC. In step S5, the upper and lower data A3, A4 and the data along the oblique direction A1, A2, A5, A6 of the drop-out position $(X_{AS}, Y_{AS})$ are read out. Then in step 6, the mean value of the data A1–A6 is taken as the data of address $(X_{AS}, Y_{AS})$ to rewrite the data in the image memory 8 into the corrected data. FIG. 5 shows the positions of the data A1–A6 and the address $(X_{AS}, Y_{AS})$ on the image screen. In step S7 the address along the direction X is added and the processes S5–S8 are repeated until $X_{AS}$ exceeds the $X_{AE}$.

Figure 6:
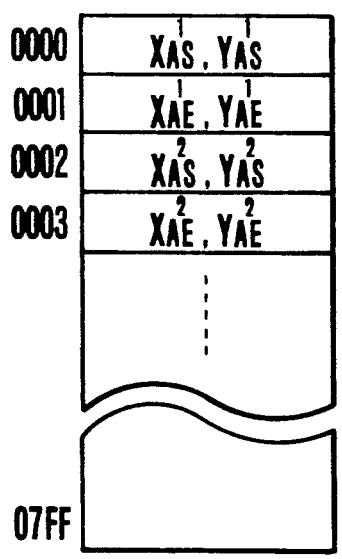
FIG. 6 shows the storing state of a DOC memory 12 of the present embodiment.

Then in step S9, the address of the address memory 12 is increased. In step S10, whether the address $A_{DOC}$ has reached a maximum value MAX or not, namely whether all of the drop-out parts in the DOC address memory 12 shown in FIG. 6 has been corrected, or not is judged. When the correction has not been finished, the above operations S2–S8 are repeated, while when the correction has been finished, the operations are terminated.

In this way all of the drop-out for one image plane has been corrected in such a manner that the data of the corrected drop-out is stored in the image memory 8.

In the case of the present embodiment, a system for correcting the content of the image memory to be delivered to the monitor has been explained. However, the present invention can also be applied to a system for transmitting the content of the image memory with a simple modification.

Further, the drop-out correction computing circuit 13 in the embodiment can be realized either by the logic calculation or that by CPU, whereby when the correcting calculation is especially complicated, it is recommended to utilize a micro processor.

As explained above, in comparison with the drop-out correcting circuit making use of a 1H delay line, according to the present embodiment, the defect of the image produced when the 1H delayed signal and the normal signal are changed over does not take place. Further, the position at which the drop-out takes place is memorized so that not only the correction can be carried out by replacing the signal before 1H, but also the correction suited for the drop-out can effectively be carried out. Namely, the correction can be carried out by making use of the upper, the lower, the left and the right signals, so that the correction with high precision is possible.

What is claimed is:

1. A video signal processing device comprising:
   (a) supplying means for supplying a video signal;
   (b) first means for memorizing said video signal at least of one field;
   (c) detecting means for detecting a drop-out of said video signal supplied by said supply means;
   (d) second means for memorizing a plurality of drop-out positions detected by said detecting means during the time period in which said video signal is being supplied to said detecting means in such at least one field by said supplying means; wherein said second means is arranged to memorize addresses of a starting point and an ending point of the drop-out detected by said detecting means, without memorizing all of the addresses for the drop-outs; and
   (e) a microprocessor for correcting the drop-out in accordance with a predetermined flow-chart on the basis of the addresses of said starting point and said ending point.

2. A video signal processing device according to claim 1, wherein said supply means includes:
   (a) means for reproducing a video signal from a medium; and
   means for transmitting said video signal reproduced by said reproducing means to said first memorizing means.

3. A video signal processing device according to claim 1, wherein said first and second means are constituted by a memory for memorizing digital data.

4. A video signal processing device according to claim 1, wherein said detecting means includes:
   (a) means for detecting the envelope of said video signal; and
   b) means for comparing the level of the envelope detected by said envelope detecting means with a certain determined value so as to detect the drop-out according to the comparing result.

5. A video signal processing device according to claim 1, further comprising:
   a) means for correcting the video signal memorized in said first memorizing means corresponding to the address memorized by said second memorizing means.

6. A video signal processing device according to claim 5, wherein said correcting means is means for replacing the video signal memorized in said first memorizing means corresponding to said address with a signal calculated from video signals around said address.

7. A video signal processing device according to claim 2, wherein said medium is a disc-shaped medium.

8. A video signal processing device according to claim 2, wherein said reproducing means includes a reproducing head.

9. A video signal correcting device comprising:
   (a) converting means for converting an analog video signal into a digital video signal;
   (b) first memorizing means for memorizing a digital video signal for at least of one field;
   (c) detecting means for detecting a drop-out of an analog signal;
   (d) second memorizing means for memorizing a plurality of drop-out positions detected by said detecting means during the time period in which said analog video signal is supplied by said converting means to said detecting means in such at least one field, wherein said second memorizing means is arranged to memorize addresses of a starting point and an ending point of the drop-out detected by said detecting means, without memorizing all of the addresses of the drop-outs; and
   (e) correcting means for correcting the digital video signal memorized in said first memorizing means in accordance with addresses of said starting point and said ending point in said second memorizing means after the video signal of such at least one field has been memorized by said first memorizing means and drop-out positions during such one field have been memorized by said second memorizing means; wherein said correcting means includes a microprocessor for correcting the digital video signal memorized by the first memorizing means in accordance with a predetermined flow-chart.

10. A video signal correcting device according to claim 9, further comprising means for supplying said analog video signal.

11. A video signal correcting device according to claim 9, wherein said supplying means includes:
   a) means for reproducing an analog video signal from a medium; and
   b) means for transmitting said analog signal reproduced by said reproducing means to said converting means.

12. A video signal correcting device according to claim 9, wherein said detecting means includes:
   a) means for detecting the envelope of said analog video signal; and
   b) means for comparing the level of the envelope detected by said envelope detecting means so as to detect the drop-out according to the comparing result.

13. A video signal correcting device according to claim 9, wherein said correcting means is means for converting information in an area corresponding to the part detected by said detecting means according to information around said area.

14. A video signal correcting device according to claim 13, wherein said surrounding area is the upper and the lower area of the areas corresponding to the part detected by said detecting means.

15. A video signal correcting device according to claim 13, wherein the surrounding area are the upper, the lower, the obliquely upper and the obliquely lower area of the areas corresponding to the part detected by said detecting means.

16. A video signal correcting method comprising:
   (a) a first step of memorizing an input video signal in memory means adapted to memorize the video signal for at least one field;
   (b) a second step of detecting drop-outs of the video signal so memorized and further memorizing addresses of a starting point and an ending point at which each drop-out took place, without memorizing all of the addresses when the video signal of such at least one field is being memorized during said first step; and
   (c) a third step of correcting the video signal memorized in said first step, depending upon the positions memorized in said second step, said third step being executed after the video signal of at least one field has been memorized in said memory means in said first step and the addresses of such starting point and ending point of drop-outs have been memorized in said second step, wherein said third step is effected by including a microprocessor for correcting the video signal memorized in said first step in accordance with a predetermined flow-chart.

17. A correcting method according to claim 16, further comprising:
   (a) a fourth step of reading out the video signal corrected in said third step from said memory means.

18. A correcting method according to claim 16, wherein said input video signal is a signal reproduced from a medium in which the video signal is recorded.

19. A correcting method according to claim 16, wherein said second step includes:
   (a) a step of detecting the drop-out of the video signal memorized in said memory means; and
   (b) a step of memorizing the position at which the drop-out detected in said detecting step took place.

20. A correcting method according to claim 16, wherein said third step includes:

(a) a step of reading out the position at which the drop-out memorized in said second step took place; and (b) a step of correcting the video signal at the position on said memory means according to the position at which the drop-out read out in said reading out step took place.

21. A video signal processing device comprising:
(a) supplying means for supplying a video signal;
(b) first means for memorizing said video signal;
(c) detecting means for detecting drop-out of said video signal supplied by said supply means;
(d) second means for memorizing the position of each such video signal drop-out detected by said detecting means, wherein said second means is arranged to memorize a starting point and an ending point of the drop-out detected by said detecting means, without memorizing all of the addresses of the drop-outs;
(e) control means for operating said first and second means cyclically at the field rate of said video signal, said control means including judgment means for identifying each completion of such field of said video signal; and
(f) a microprocessor for correcting said video signal in accordance with a predetermined flow-chart on the basis of the addresses of said starting point and said ending point memorized by said second means.

22. A video signal correcting method comprising:
(a) a first step of memorizing an inputted video signal in memory means;
(b) a second step of detecting a drop-out of the video signal memorized in said memory means to memorize the addresses of a starting point and an ending point of the drop-out detected by said detecting step, without memorizing all of the addresses of the drop-outs; and
(c) a third step of correcting the video signal corresponding to the addresses for said starting point and said ending point memorized in said second step, in accordance with a predetermined flow-chart.

23. A correcting method according to claim 22, further comprising:
a) a fourth step of reading out the video signal corrected in said third step from said memory means.

24. A correcting method according to claim 22, wherein said video signal to be inputted is a signal reproduced from a medium in which the video signal is recorded.

25. A correcting method according to claim 22, wherein said memory means memorizes a video signal at least of one field.

26. A correcting method according to claim 22, wherein said second step includes:
(a) a step of detecting the drop-out of the video signal memorized in said memory means; and
(b) a step of memorizing the position at which the drop-out detected in said detecting step took place.

27. A correcting method according to claim 22, wherein said third step includes:
(a) a step of reading out the position at which the drop-out memorized in said second step took place; and
(b) a step of correcting the video signal at the position on said memory means according to the position at which the drop-out read out in said reading out step took place.

* * * * *